March 24, 1970 V. H. SIETMANN 3,501,845
APPARATUS FOR AND PROCESS OF DRYING GRAIN
Filed Nov. 20, 1968 2 Sheets-Sheet 1
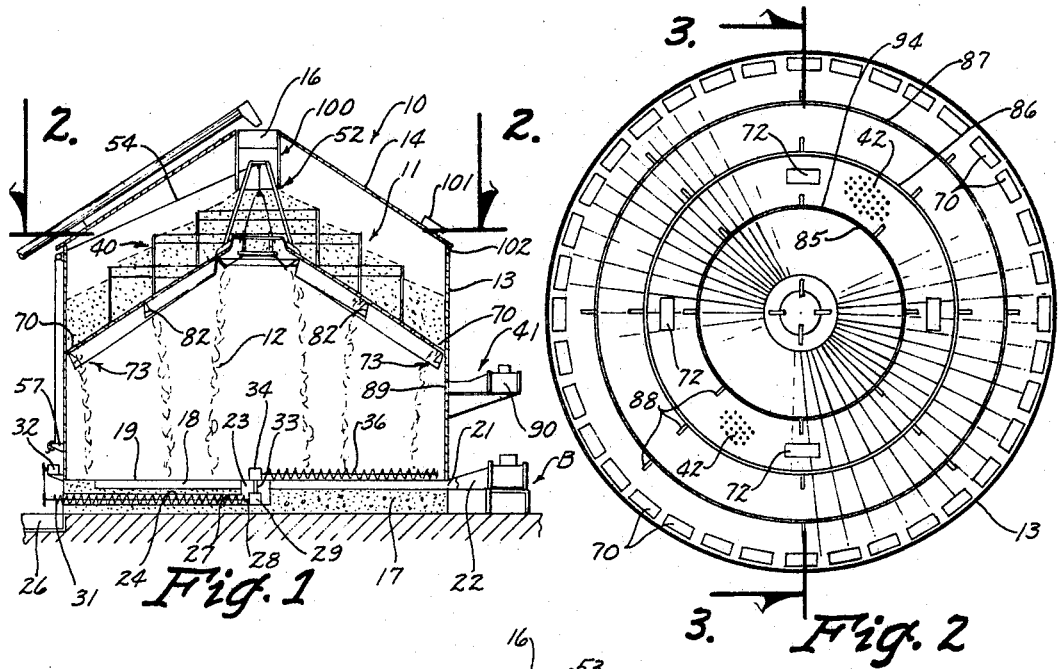
Fig. 1
Fig. 2
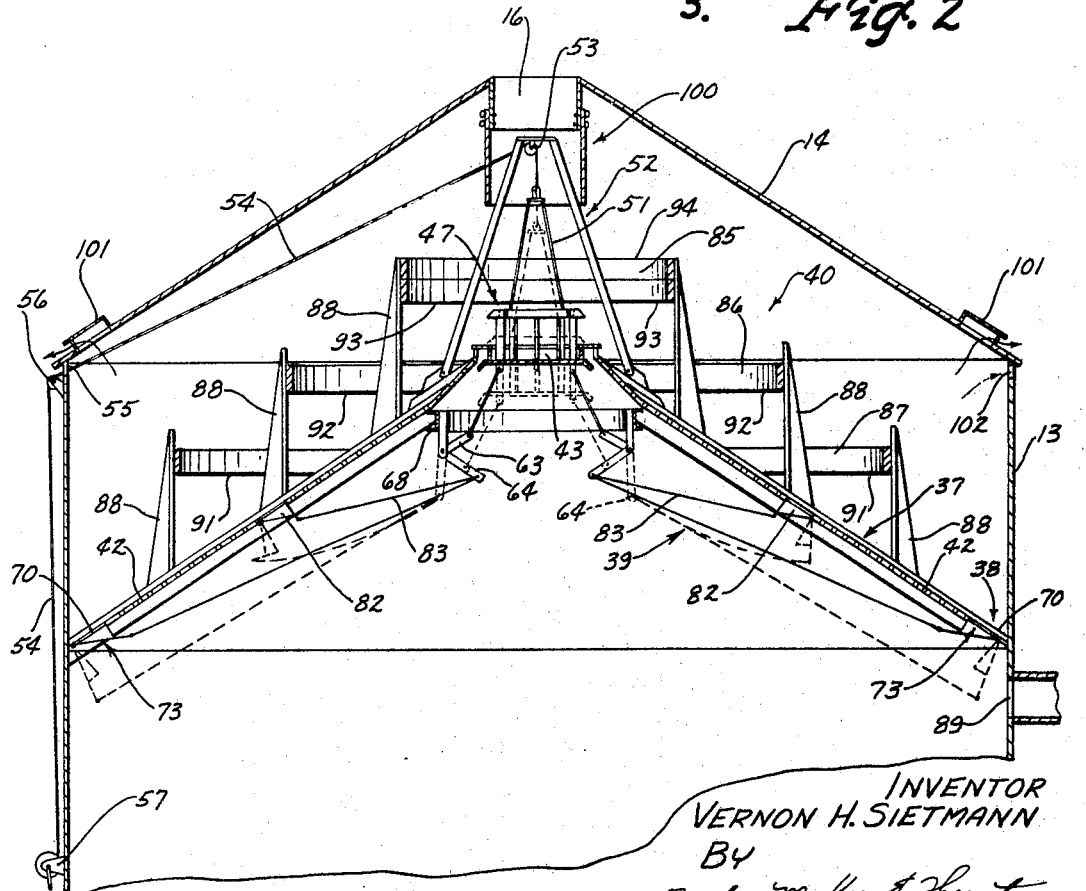
Fig. 3
INVENTOR
VERNON H. SIETMANN
BY
Zarley, McKee & Thomte
ATTORNEYS March 24, 1970  V. H. SIETMANN  3,501,845
APPARATUS FOR AND PROCESS OF DRYING GRAIN
Filed Nov. 20, 1968  2 Sheets-Sheet 2

INVENTOR
VERNON H. SIETMANN
BY
Zarley, McKee & Thomte
ATTORNEYS

United States Patent Office 3,501,845
Patented Mar. 24, 1970

3,501,845
APPARATUS FOR AND PROCESS OF DRYING GRAIN
Vernon H. Sietmann, Laurel, Iowa, assignor of thirty percent to Gerald F. Dendel, Costa Mesa, Calif., twenty percent to Leonard Lukehart, Laurel, Iowa, ten percent to Wanda and Raymond Smith, both of Laurel, Iowa, and ten percent to Beth and Larry Keese, both of Gilman, Iowa
Continuation-in-part of application Ser. No. 669,928, Sept. 22, 1967. This application Nov. 20, 1968, Ser. No. 777,450
Int. Cl. F26b 17/12, 5/00
U.S. Cl. 34—33                                    15 Claims

ABSTRACT OF THE DISCLOSURE

This invention comprises an inverted frusto-conical shaped perforated floor which is mounted in a conventional grain drying bin in a raised position relative to the base floor thereof. The perforated floor has a plurality of grain discharge openings formed therein, each of which are selectively closed by a perforated trap door means. A movable valve means is movably mounted in a central opening formed in the perforated floor and is movable from closed to opened positions. The valve means and the trap doors are interconnected whereby the opening of the valve means also causes the trap doors to be opened. A series of bands are concentrically mounted above the perforated floor to maintain the level of the grain being dried substantially parallel to the upper surface of the perforated floor for evenness of drying and to also make it possible to dry a predetermined amount of grain. The grain is dumped on the floor and the dried air is passed upwardly through the perforated trap doors to dry the grain. After the grain has been dried, the valve means and the trap doors are moved to their open positions to permit the grain to pass downwardly through the central opening and through the grain discharge openings in an even manner to the base floor of the storage bin.

---

This is a continuation-in-part application of the application, Ser. No. 669,928 filed Sept. 22, 1967.

This invention pertains to the drying of granular material and more particular to the drying of grain. Many attempts have been made to provide a means for satisfactorily drying grain. One method utilizes a grain drying bin, one method utilizes a portable batch dryer, and another method utilizes a grain drying bin which dries one batch at a time but which then requires that the batch be transferred to another bin for storage purposes. A disadvantage of the first method referred to above is primarily in subjetcing several lower levels of the grain in the bin to the drying process several times. Also, in introducing the grain to be dried into this type of bin, it must be levelled by mechanical means, and in some instances stirring auger type devices are used to aid aeration of the grain. The second and third methods require additional equipment and time for handling the grain with respect to moving it from the drying equipment to the storage equipment, all of which increase the drying costs and the possible damage to the grain by over-handling.

Another method of grain drying, not as well known as the former methods, is that of batch drying grain within the upper portion of a conventional grain drying bin. This latter method uses a substanitally horizontal floor with trap door or gate means formed therein, and with drying air being forced beneath the upper floor, passing therethrough to dry the grain thereabove. After drying, the grain is dumped onto the base floor of the bin for storage purposes. Disadvantages of this method are believed to include an excess of equipment such as a grain leveller mounted above the upper floor for distributing grain in a level manner thereon, and the provision of a sweep auger also directly above the upper floor for aiding in the dumping of the grain after drying through the doors or gates.

Applicant's earlier apparatus for drying grain as disclosed in the application, Ser. No. 669,928, did not provide for any means to discharge the grain from the center of the inclined perforated floor which sometimes resulted in the grain being deposited on the base floor in an uneven manner. Further, the interconnection means between the various trap doors of applicant's parent application was perhaps unduly complicated and cumbersome to install.

Therefore, it is a principal object of this invention to provide an improved apparatus for drying grain.

A further object of this invention is to provide an apparatus for drying grain which can be added to existing, conventional grain bins with even economy.

A still further object of this invention is to provide a grain drying apparatus for use in conventional grain bins wherein storage space therein is used to the utmost.

A still further object of this invention is to provide a grain drying apparatus wherein the provision of a moving grain levelling device of any type is eliminated.

A still further object of this invention is to provide a grain drying apparatus which includes an inclined supporting floor positioned above the base floor of the bin, the inclined floor having a central opening formed therein which is selectively closed by a movable valve means.

A further object of this invention is to provide a grain drying apparatus including an inclined supporting floor positioned above the base floor of the bin, the inclined floor having a plurality of trap doors selectively closing a plurality of openings formed therein, the operation of the trap doors being co-ordinated with the opening and closing of a central valve means.

A further object of this invention is to provide an attachment for conventional grain drying bins which provides for batch drying therein whereby off-season capacity of the bin is increased over that normally had.

A still further object of this invention is to provide an improved process for drying grain wherein as the grain dries, it tumbles downwardly due to the drying action, said tumbling action increasing the drying efficiency of the process, and obviating the need of mechanical stirring or agitation of the grain.

A further object of this invention is to provide a grain drying apparatus which is economical of manufacture, efficient in operation and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a vertical cross-sectional view of the grain drying apparatus of this invention shown and installed in assembled relationship with a grain bin;

FIG. 2 is an enlarged sectional view as seen along lines 2—2 of FIG. 1;

FIG. 3 is a fragmentary vertical cross-sectional view of the grain drying apparatus of this invention, the broken lines indicating the alternate positions to which the valve means and trap doors may be moved;

Figure 4:
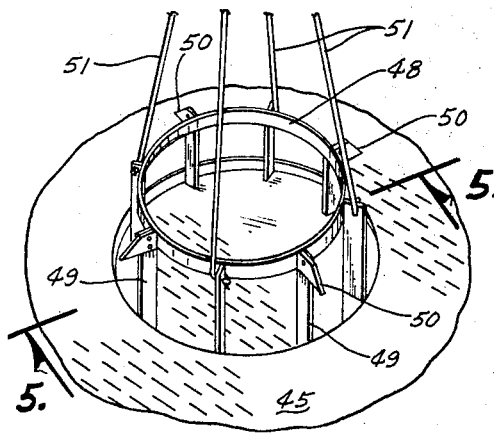
FIG. 4 is a fragmentary top perspective view of the movable valve means and its associated structure.
Figure 6:
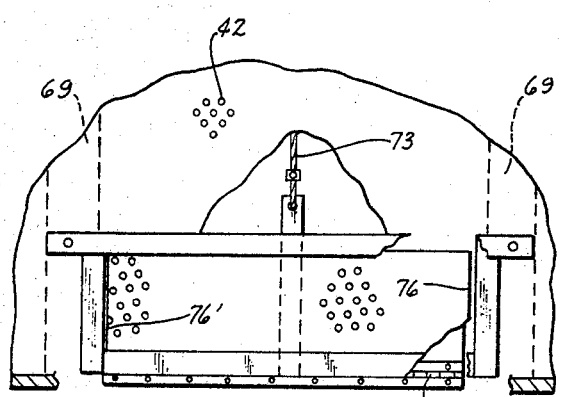
FIG. 6 is an enlarged fragmentary sectional view as seen along lines 6—6 of FIG. 5.

The numeral 10 generally designates a conventional grain bin which houses the grain drying apparatus indicated generally at 11 which is capable of drying granular material 12 for subsequent storage in the lower part of the bin 10.

The grain bin 10 comprises a side wall 13 and a conical shaped roof 14 mounted thereon. An opening 16 is formed in the apex of the roof 14, and therebelow is found a foundation or base floor 17. The base 17 has an X-shaped trough 18 formed therein, and spaced above the surface of the base floor 17 is a perforated plate 19 capable of holding granular material while enabling air from therebelow to pass upwardly therethrough.

One leg of the trough 18 fluidly communicates to the exterior of the bin 10 through a passage 21 formed on the side wall 13. A blower system B is fluidly communicable with the trough 18 through duct 22, and upon energizing the blower B, air is forced into the trough 18 whereupon it circulates upwardly through a perforated floor plate 19 and through granular material stored thereon for aeration purposes.

At the center of the lower floor 19, a sump opening 23 is formed therein which is fluidly communicable with a tunnel 24 formed in the lower floor 19. The tunnel 24 leads from the sump opening 23 to a pit 26 formed in the ground immediately outside the bin 10. An auger 27 is axially mounted in the tunnel 24, with one end 28 thereof secured to a gear housing 29 mounted in the base of the sump opening 23, and with the other end 31 extending into the pit 26. A motor 32 is mounted on the outside of the bin 10 and is belt connected to the auger 27 for rotating the same The gear housing 29 has a vertically disposed shaft 33 rotatably mounted therein which extends upwardly therefrom. Secured to the upper part of the shaft 33 is a second gear housing 34. A sweep auger 36 is rotatably attached to the gear housing 34 and is operated thereby. The motor 32 is operable to rotate the auger 27 which in turn causes the sweep auger 36 to rotate about its horizontal axis and to rotate about the shaft 33. The purpose of the auger 27 and the sweep auger 36 will be described more in detail hereinafter.

The drying apparatus 11 of this invention comprises generally an overhead floor structure indicated generally at 37 in FIG. 1 and includes a floor support structure indicated generally at 38, a grain discharge apparatus indicated generally at 39, and a grain levelling control apparatus indicated generaly at 40 in FIG. 1. A drying apparatus indicated generally at 41 is also utilized with the invention and of course is necessary for the entire drying process to occur.

The overhead floor structure 37 comprises specifically an inverted, frusto-conical shaped perforated floor 42. It is seen that the majority of the floor 42 slopes downwardly from a central opening 43 with the slope of the floor 42 being somewhat parallel to the slope of the roof 14, although this is not critical. A collar 44 is mounted in the central opening 43 and includes a horizontal portion 45 and a vertical portion 46 extending downwardly from the inner end thereof.

Figure 5:
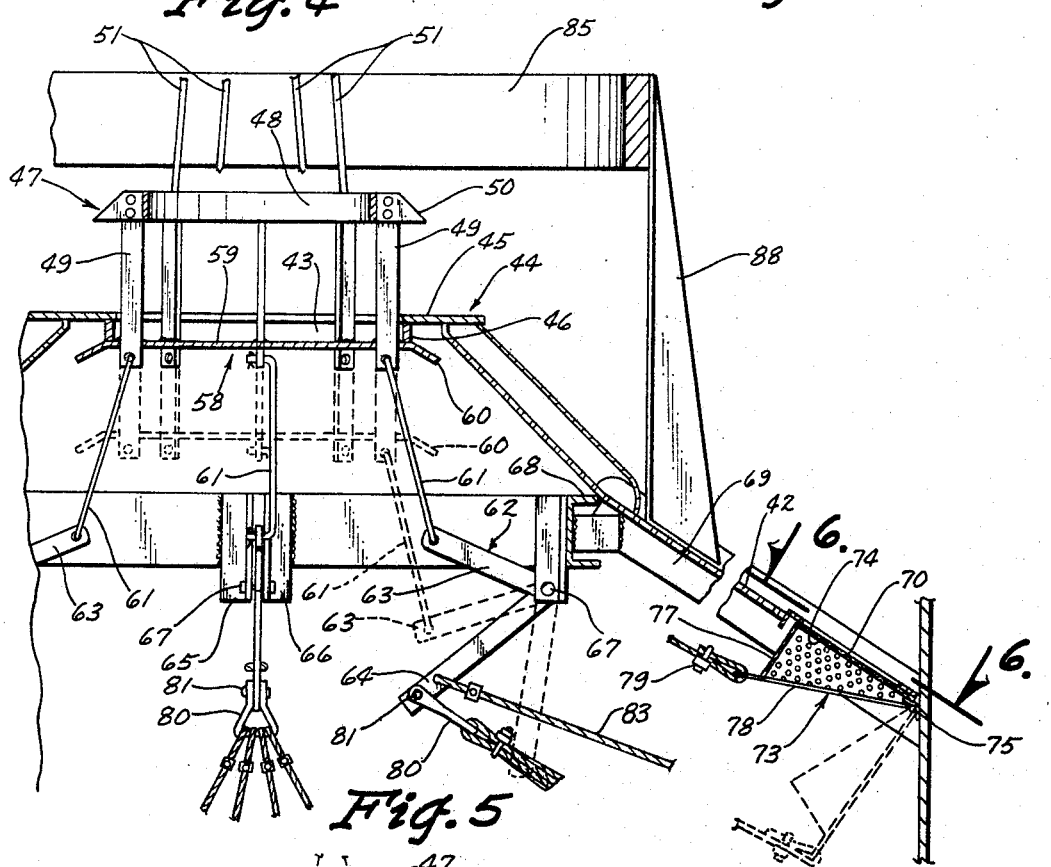
FIG. 5 is an enlarged fragmentary sectional view as seen along line 5—5 of FIG. 4, the broken lines indicating the alternate positions of the valve means and trap doors.

The numeral 47 generally indicates a valve means which is movably mounted in the central opening 43. Valve means 47 includes an upper ring member 48 having a plurality of arms 49 secured thereto by any convenient means and extending downwardly therefrom as illustrated in FIG. 5. As seen in FIG. 4, certain of the arms 49 have ears 50 secured to the upper ends thereof which extend outwardly therefrom. Those arms 49 which do not have the ears 50 have a rod 51 detachably pivotally secured thereto as illustrated in FIG. 4. As seen in FIG. 5, the ears 50 will eangage the horizontal portion 47 of collar 44 to limit the downward movement of the valve 47 with respect to the opening 43. The numeral 52 generally indicates a valve supporting structure which is operatively secured to the floor 42 and extends upwardly therefrom as best illustrated in FIG. 3. A pulley 53 is rotatably mounted at the upper end of the supporting structure 52 and is adapted to accommodate a cable 54 extending therearound. One end of cable 54 is secured to the upper end of the rods 51. Cable 54 extends outwardly through an opening 55 in bin 10 and extends over the pulley 56 rotatably mounted on the exterior of the bin. The other end of the cable 54 is operatively secured to a winch means 57 to control the raising and lowering of the valve 47. A plate 58 is secured to the lower ends of the arms 49 and includes a horizontal portion 59 and a peripheral edge portion 60 which extends downwardly and outwardly from the horizontal portion 59. As seen in FIG. 5, plate 58 is adapted to engage the lower end of the vertical portion 46 of collar 44 when the valve 47 is raised by the winch 57 to effectively close the opening 43. If desired, plate 58 may be perforated to permit the flow of air upwardly therethrough.

Pivotally secured to the lower end of each of the arms 49 is a link 61. The lower end of each of the links 61 is pivotally secured to an angular cam arm 62 including arm portions 63 and 64. The cam arm 62 is pivotally connected to a pair of spaced apart angle brackets 65 and 66 by means of a pin 67. Angle brackets 65 and 66 are secured to a channel shaped ring 68 which is operatively secured to the under side of the roof 42 and extends therearound as illustrated in FIGS. 3 and 5. Ring 68 is operatively secured to a brace arm which is secured to the underside of roof 42 and extends downwardly and outwardly along the bottom side thereof as illustrated in FIGS. 3 and 5.

The numeral 70 designates an outer set of openings formed in the floor 42 while the numeral 72 generally designates an intermediate set of openings formed in floor 42. It will be noted that the openings 70 are arcuately and equidistantly spaced with respect to each other and that the openings 72 are arcuately and equidistantly spaced with respect to each other. The numeral 73 generally designates a perforated trap door which is operatively pivotally connected to the floor 42 at each of the openings 70. Each of the trap doors 73 include a perforated top portion 74, perforated sides 75 and 76, and a perforated inner wall 77 which extends downwardly from the inner end of the top 74. A strap 78 is operatively secured to the trap door 73 (FIG. 5) and has a cable 79 detachably secured to its inner end. The other end of the cable 79 is secured to a clevis 80 which is pivotally connected to the lower end of member 64 by pin 81. Thus, each of the trap doors 73 have a cable 79 which extends to its respective cam arm 62 so that the trap door 73 will be pivoted up into its closed position with respect to opening 70 when the valve 47 is raised to its closed position.

The numeral 82 generally designates a perforated trap door which is provided at each of the openings 72 to close the same in a manner identical to which the trap doors 73 close the openings 70. Each of the trap doors 82 have a cable 83 operatively secured thereto which is secured to its respective cam arm 62 as illustrated in FIG. 5. Thus, the trap doors 73 and 82 will close the openings 70 and 72 respectively when the valve 47 is raised to its closed position by the winch means 57. Conversely, the trap doors 73 and 82 will pivot away from their openings 70 and 72 respectively when the valve 47 is lowered to the position illustrated by broken lines in FIG. 5.

The grain levelling control apparatus 40 comprises a plurality of bands best illustrated in FIG. 3. These bands include an upper band 85, the center of which is the center of the grain bin 10, a middle band 86 disposed concentrically about the upper band 85 and therebelow, and a lower band 87 disposed also concentrically about the upper and middle bands 85 and 86, respectively and therebelow. Each band is disposed above the upper floor 42 by means of a plurality of arcuately spaced trusses 88. Formed in the side wall 13 immediately below the lower edge of the upper floor 42 is an opening 89. A blower system 90, having a heating unit (not shown) installed therein, is mounted outwardly of the grain bin and is in fluid communication with the grain bin below the upper floor 42 through the opening 89. The blower system 90 supplies air to the grain bin below the upper floor 42, which air percolates upwardly through the upper floor 42 and any granular material 12 disposed thereon and exits through the roof opening 16. The heating unit of the system 90 is controlled by moisture sensing device (not shown) mounted on the side wall 13 extended into the grain bin above the upper floor 42. The numeral 100 generally refers to a vertically telescopically adjustable tube secured to the roof 14 at the opening 16 and extending downwardly therefrom.

Operation of the drying apparatus 11 as illustrated in the drawings is as follows. With all of the trap doors 73 and 82 closed, and with the valve means 47 raised to its closed position (FIG. 5), and with the bands 85, 86 and 87 so mounted on their respective supports to receive a full batch of grain, the grain is dumped through the opening 16 through tube 100 and onto the valve 47. The grain then falls downwardly about the floor 42 in all radial directions until it hits the juncture of the floor 42 and the side wall 13, at which time it begins to fill up that portion of the grain bin 10 above the upper floor 42. The lighter chaff and foreign material mixed with the grain separates from the grain during the falling process, with the heavier grain tending to settle to the bottom of the floor 42.

The filling up process continues until the grain completely fills the area between the lower edge 91 of the lower band 87 and the surface of the floor 42, at which time additional grain cannot pass therebetween. The grain then begins to fill the space up between the lower band 87 and the middle band 86 such that when the grain reaches the lower edge 92 of the middle band 86, the grain has reached the upper edge of the lower band 87. Again, with the area between the lower edge 92 of the middle band 86 and the surface of the floor 42 clogged up, so to speak, additional grain cannot pass therebetween and the grain builds upwardly toward the lower edge 92 of the upper band 85 wherein the same process occurs. Grain is continued to be supplied to the apparatus until the grain reaches the bottom of the tube 100 (FIG. 1).

When the grain has reached the lower end of the tube 100, the flow of grain is stopped. Thus, a full batch of grain has then been supplied into the space of the grain bin above the floor 42. As the bands are substantially aligned with each other in parallel to the slope of the floor 42, it is seen that the upper surface of the grain above the floor 42 is substantially parallel to the surface of the floor itself.

Thus, upon the entry of drying air through the opening 89 formed in the side wall 13 of the bin 10, which air then passes upwardly through the perforated floor 42 for drying the grain held thereabove, an even drying of the grain occurs. The lighter chaff and foreign material suspended above the grain are caught in the rising air current and are exited through the roof opening 16 along with the air. The moist air is permitted to escape from the bin through roof vents 101 (FIG. 3) and through spaced apart openings 102 formed in the upper end of wall 13. Subsequent to the drying process, and upon the completion thereof, operation of the winch 57 by the operator will cause the valve means 47 to be lowered which in turn causes the openings of all of the trap doors 73 and 82 due to the interconnection therebetween as previously described. As the valve means 47 is lowered by the winch 57, the weight of the grain above the trap doors 73 and 82 also aid in the opening of the doors. The fact that the trap doors 73 and 82 are perforated also permits the upwardly moving air to pass therethrough to assure an even flow of air through the grain. Thus, when the valve means 47 and the trap doors 73 and 82 are opened by the winch 57, all of the grain above the floor 42 is dumped onto the lower floor 19 of the grain bin. The arrangement of the openings 70, 72 and 43 is such that when the grain has fallen onto the floor 19, it assumes a substantially level condition such that means for levelling the grain on the floor 19 are unnecessary. It should be noted at this time that the operation of the blower system 90 for transmitting dry air through the opening 89 is of course controlled by the operation of the moisture sensing device as determined by the atmospheric condition within the grain bin 10 above the upper floor 42. Furthermore, it is entirely conceivable that automatic equipment may be substituted for the manually operated winch 57, such that upon a cessation of the drying cycle for the gain above the upper floor 42, the equipment substituted for the winch 57 is automatically actuated to open the trap doors 73 and 82 and valve 47 thereby automatically dumping the grain onto the lower floor 19 for storage purposes. Upon evacuation of the area above the upper floor 42, an additional batch of grain may be again dumped thereon and the drying process repeated.

Aeration for the stored grain is provided by energizing the blower D for forcing cool air through the duct 22. The cool air, as it passes upwardly through the stored grain will absorb heat therefrom and carry it upwardly. Advantageously, the cool air, now heated, passes through the perforated floor 42 and augments the heated air supplied by the blower system 90.

To evacuate the grain from the lower floor 19, the sweep auger 36 is operated to move the grain into the sump opening 23, then the motor 32 is energized and the grain is carried outwardly of the grain bin 10 through the tunnel 24 and into the pit 26.

The drying process as to the second batch of granular material in the grain bin above the upper floor 42 is again repeated in the manner described hereinbefore, with the process being repeated over and over again until, and unless of course, the storage area below the floor 42 is completely filled without removal of the stored grain.

It is seen that the process of drying grain which is provided by the apparatus 11 as described hereinbefore, and by any other apparatus the equivalent thereof, comprises the following steps: Holding the grain to be dried above a supporting surface such as the upper floor 42; passing air from below the supporting surface 42 upwardly through the grain, the air passable through the surface 42 by means of its being perforated; and providing for the grain to tumble downwardly at an angle relative to the vertical due to its own drying action; while maintaining it still above the supporting surface of floor 42. To elaborate on the cause of tumbling, as the grain dries, it shrinks in size; furthermore as the wetness factor is reduced, less cohesion is had between the kernels, the overall result being a decreasing resistance to gravity and thus a combined shrinkage and falling resulting in the tumbling action. This process is to be compared to the normal process wherein grain is held on a horizontal surface such that when the drying air is passed upwardly therethrough, as compared to the grain tumbling downwardly and sidewardly, were on an angle relative to the vertical, the grain merely settles straight downwardly in a vertical axis due to its being dried.

Such angular, downwardly tumbling action of each kernel of grain separates said kernel from the adjacent kernels, tumbling it over such as to provide not only the separation but a change of position of all kernels, thereby aiding and increasing the efficiency of the drying process.

The drying process is added to by the improved dumping process, used in combination therewith, whereinafter the drying process is completed, the dried grain is dumped by the particularly placed openings 70, 72 and 43 such that when fully settled onto the bottom or lower floor 19 of the grain bin 10, the upper surface of the "dumped" grain is substantially level. As mentioned hereinbefore, this obviates the need for levelling equipment in the lower part of the bin 10.

Figure 7:
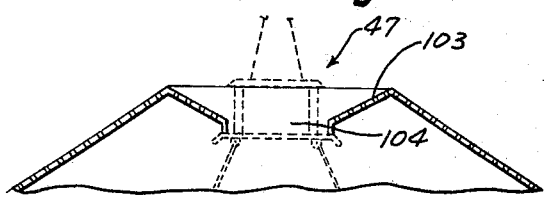
FIG. 7 is a partial vertical sectional view of a modified form of the overhead floor structure.

Thus it can be seen that the apparatus disclosed herein is not only an improvement over the prior art but is also an improvement over applicant's previous apparatus. The present apparatus insures that the grain will be evenly dried on the floor 42 and then will be dumped onto the floor 19 in an even manner through the particular placement of the openings 70, 72 and 43. The means of co-ordinating the opening of the valve 47 with the trap doors 73 and 82 insures that the grain will be dumped in an even condition to the floor 19 therebelow. The fact that the trap doors 73 and 82 are perforated insures that the air will pass evenly through the grain positioned thereabove. A modified form of the overhead floor structure is shown in FIG. 7 wherein it can be seen that the central portion thereof is inclined inwardly and downwardly to form a central depression portion 103 having a collar 104 secured thereto and extending downwardly therefrom. The valve 47 engages the collar 104 to close the opening 105 formed therein in an identical manner to that previously described in the operation of valve 47. The configuration of the floor seen in FIG. 7 permits the grain to more quickly dump at the center and permits a slightly greater depth of the grain at the center. Thus it can be seen that the apparatus accomplishes at least all of its stated objectives. It can also be seen that the process described herein accomplishes at least all of its stated objectives.

Some changes may be made in the construction and arrangement of my Apparatus For and Process of Drying Grain without departing from the real spirit and purpose of my invention, and it is my intention to cover by my claims, any modified forms of structure or use of mechanical equivalents which may be reasonably included within their scope.

I claim:

1. Apparatus for drying granular material in a grain bin having an enclosure forming wall, a roof mounted over the wall, and a base floor for the wall, the apparatus comprising:

a floor mounted in the upper part of the bin, said floor being inclined and sloping downwardly from the center of the bin toward and in contacting relation with the wall whereby grain disposed on said floor is prevented from falling onto said base floor, said floor having a plurality of openings formed therein through which the granular material can fall, said floor having a central opening formed therein, a valve means movably mounted in said central opening and being movable from a closed position to an open position, first means connected to said vlave means for moving said valve means to its closed and open positions, closure means operatively connected to said floor for closing said openings, and means for supplying drying air within the bin and below said floor.

2. The apparatus of claim 1 wherein said first means and said closure means are operatively interconnected by a connection means adapted to co-ordinate the opening and closing of said valve means.

3. The apparatus of claim 1 wherein said openings are arcuated equidistantly spaced.

4. The apparatus of claim 2 wherein said closure means includes a trap door at each opening normally held closed over said each opening and capable of being hingedly opened by the weight of the grain thereabove, said connection means including a system of cables interconnecting all trap doors and said valve means whereby said trap doors will be opened when said valve means is opened.

5. The apparatus of claim 1 wherein circular means are mounted on said floor and extending around the bin above said floor and capable of holding the granular material at substantially a constant level over said floor.

6. The apparatus of claim 4 wherein each of said trap doors are perforated whereby they are capable of holding granular material on their upper surfaces while permitting air to pass upwardly therethrough.

7. The apparatus of claim 1 wherein said floor includes a collar defining said central opening, said valve means being movably mounted in said collar and having a sealing surface provided thereon adapted to engage said collar to close said central opening when said valve means is moved to its closed position.

8. The apparatus of claim 7 wherein said collar is horizontally disposed and has a lower peripheral edge, said valve means including a bottom plate adapted to be moved upwardly into engagement with the lower peripheral edge of said collar to close said central opening when said valve means is moved to its closed position.

9. The apparatus of claim 8 wherein a plurality of arms are pivotally secured at their upper ends to said bottom plate and which extends downwardly therefrom, each of said arms being pivotally secured at its lower end to a link arm, said link arms being connected to said trap doors by said cables.

10. The apparatus of claim 1 wherein horizontally disposed band members are mounted above said floor to hold granular material at substantially a constant level on said floor.

11. The apparatus of claim 1 wherein said floor has an inverted frusto-conical shape.

12. The apparatus of claim 8 wherein said valve means has a stop means on its upper end adapted to engage said collar to limit the downward movement of said valve means with respect to said collar.

13. The apparatus of claim 1 wherein said floor has a central depression portion surrounding said central opening, said central depression portion extending upwardly and outwardly from said central opening.

14. The apparatus of claim 10 wherein a vertically telescopically adjustable tube is centrally secured to said roof over said band members and extends downwardly therefrom.

15. The apparatus of claim 1 wherein said roof has a roof vent means provided thereon to permit air to escape therethrough from the interior of said bin, said wall having a plurality of spaced apart openings formed therein at its upper end adapted to permit the escape of air therethrough from the interior of the bin.

References Cited

UNITED STATES PATENTS

| | | | |
|---|---|---|---|
| 532,903 | 1/1895 | Pierce | 34—17.5 |
| 855,312 | 5/1907 | Higden | 34—174 |
| 884,696 | 4/1908 | Wilson | 34—79 |
| 1,225,403 | 5/1917 | Borislarsky | 34—79 |
| 2,788,263 | 4/1957 | Engelke | 34—172 X |
| 2,469,424 | 5/1949 | Wood et al. | 34—171 X |
| 2,858,620 | 11/1958 | Naylor | 34—174 X |
| 3,237,315 | 3/1966 | Benecke | 34—174 X |

LLOYD L. KING, Primary Examiner

U.S. Cl. X.R.

34—174